United States Patent Office 3,073,766
Patented Jan. 15, 1963

3,073,766
CATALYST PREPARATION
Delos E. Bown, Thomas P. Gorman, and Albert T. Watson, Baytown, Tex., assignors, by mesne assignments, to Esso Research and Engineering Company, Elizabeth, N.J., a corporation of Delaware
No Drawing. Filed Dec. 18, 1957, Ser. No. 703,484
8 Claims. (Cl. 204—154)

This invention relates to a method for the preparation of ionic polymerization catalysts. More particularly, this invention relates to a method for the preparation of a titanium subchloride polymerization catalyst.

In copending application Ser. No. 703,483, filed of an even date herewith, and a continuation-in-part of application Ser. No. 538,518, filed October 4, 1955 both now abandoned, there is disclosed a method of preparing titanium subhalide type catalysts by the irradiation of a solvent solution of a titanium halide. The polymerization catalysts prepared from titanium tetrachloride by the process described in the aforesaid copending applications are brown precipitates which may be thermally decomposed to provide a violet titanium trichloride at about 450° to 460° F.

It has now been discovered that violet titanium subchlorides useful in catalysts for the ionic polymerization of alpha olefins may be directly prepared by irradiating a solvent solution of titanium tetrachloride at a temperature of more than about 500° F. with high intensity ionizing radiation.

The starting material for the present invention is titanium tetrachloride. The solvent to be employed in accordance with the present invention should be a nonpolar organic solvent which contains carbon-hydrogen bonds. Thus there may be used paraffinic hydrocarbons, naphthenic hydrocarbons, aromatic hydrocarbons, partially chlorinated hydrocarbons, etc. When the irradiation is to be conducted at substantially atmospheric pressure, a solvent which is a liquid at temperatures above about 500° F. should be used such as, for example, cetane, n-octadecane, n-tetracosane, 2-methylheptadecane, 1,2-cyclohexylethane, 1,2,3,4 - tetraethylbenzene, diphenylmethane, 1,2-diphenylethane, naphthalene, 1,6-dimethylnaphthalene, anthracene, phenanthrene, orthodiphenylenemethane, etc. A preferred solvent is cetane in that cetane is a liquid at room temperature and remains liquid at irradiation temperatures in excess of 500° F. When the irradiation reduction is conducted at elevated pressures such as pressures within the range of 10 to 50 p.s.i.g., lower molecular weight solvents may be employed. Mixtures of two or more solvents may be employed, if desired.

The reaction medium for the present invention is prepared by dissolving titanium tetrachloride in the solvent. Although solutions containing from about 0.1 to 20 volume percent of titanium tetrachloride may be employed, in accordance with the present invention, it is preferable to employ solutions containing a high concentration of titanium tetrachloride in order to obtain the most efficient utilization of the radiation.

The irradiation should be conducted at temperatures in excess of about 500° F. and preferably at a temperature within the range of about 520° to about 600° F. Still higher temperatures may be utilized provided that the reaction mixture is maintained in liquid phase by any suitable means (e.g., through the use of higher than atmospheric pressures).

A solution of the above-described character is irradiated at a temperature above about 500° F. with irradiation of an intensity sufficient to generate ion pairs. The sufficiency of radiation may be determined, if necessary, through the use of a suitable radiation detector. Thus, for example, there may be used a bubble counter of the type disclosed by D. A. Glaser and D. C. Rahm in an article entitled "Characteristics of Bubble Chambers" (Physical Review, vol. 97, No. 2, Jan. 15, 1955, pp. 474 to 479), wherein a superheated sample of a solution of the present invention may be irradiated. If the radiation is sufficient, ion pairs will be formed and at least some of the ion pairs will serve as nucleating agents for the superheated solution, whereby bubbles will be formed along the paths of travel of such ion pairs. Various forms of ionizing radiation may be used, including for example, high energy electrons, beta rays, gamma rays, bremsstrahlung, X-rays, alpha particles, tritons, deuterons, protons, neutrons, the various measons and hyperons, and also recoil fragments of nuclear fission, fusion and spoilation reactions. In many instances it is desirable that the radiation have an intensity sufficient to provide an energy input of from about 0.5 to about 5,000 watthours of radiation per kilogram of solution during a period of about 0.1 to about 10 hours. It is frequently preferable to provide an energy input of from about 5 to 500 watthours of radiation per kilogram of solution.

As a result of this treatment, the titanium tetrachloride is at least partially reduced to a titanium subchloride. Normally, the titanium tetrachloride is reduced by about 1 valence state.

The subchloride precipitates from the solution as formed whereby there is provided at the end of the irradiation treatment a suspension of finely divided titanium subchloride in the solvent.

The subchloride may be recovered from the liquid medium (consisting essentially of the original solvent and by-product organic chlorides). If desired, the suspension may be utilized in conjunction with an activating agent such as an aluminum alkyl as a medium for the polymerization of alpha olefins such as ethylene, propylene, butene-1, butadiene, etc. In this latter situation, the suspension should be substantially completely free from water, oxygen, and compounds having substantial polarity. Accordingly, in this case the solvent is purified prior to use for the removal of contaminants by any suitable means such as, for example, by refluxing over metallic sodium or any suitable agent, followed by distillation in an inert atmosphere. In like fashion, the irradiation is conducted in this fashion in the absence of water, oxygen, or other compounds of substantial polarity.

The invention will be further illustrated by the following specific examples which are given by way of illustration and not intended as limitations on the scope of this invention.

A plurality of solutions of titanium tetrachloride in cetane were prepared and irradiated with high energy cathode rays at predetermined temperatures for predetermined periods of time. The samples prepared, the irradiation temperatures and times, and the radiation intensities and dosages are set forth in the following table. In all instances the titanium tetrachloride was reduced. The nature of the precipitate is also set forth in Table I.

TABLE I

*Reduction of Titanium Tetrachloride by High Energy Radiation*

| Run No. | Ml. TiCl₄ | Ml. Cetane | Temp., °F. | Time, Min. | MEV. | M-amps. | Color of Catalyst | "G" Value |
|---|---|---|---|---|---|---|---|---|
| 234 | 5 | 300 | 425–470 | 60 | 2 | 40 | Brown | |
| 235 | 10 | 400 | 437–452 | 15 | 2 | 100 | do | |
| 242 | 6 | 300 | 480–500 | 15 | 2 | 40 | do | |
| 236 | 6 | 300 | 524–537 | 30 | 2 | 40 | Violet | |
| 237 | 6 | 300 | 524–536 | 8 | 2 | 150 | do | |
| 239 | 6 | 300 | 525–530 | 30 | 2 | 40 | do | −2.9 |
| 241 | 6 | 300 | 522–525 | 15 | 2 | 40 | do | −4.73 |
| 238 | 6 | 300 | 85–100 | 42 | 2 | 40 | Brown | −1.82 |
| 240 | 3 | 300 | 80–85 | 15 | 2 | 41.5 | do | −2.63 |

From Table I it will be observed that a brown precipitate was obtained in each instance wherein the radiation temperature was 500° F. or less, whereas violet titanium subchloride was obtained in each instance wherein the temperature was maintained in excess of 500° F.

Equivalent results are obtained when the cetane solvent is replaced with naphthalene, the naphthalene being heated above its melting point prior to the addition of the titanium tetrachloride in this instance.

Equivalent results are also obtained when a solution of titanium tetrachloride in normal cetane is irradiated at a temperature in excess of about 500° F. with the gross radiation emanating from a heterogeneous thermal nuclear reactor largely fueled with uranium-235.

Violet titanium subchloride is also obtained when a cetane solution of titanium tetrachloride is irradiated at a temperature in excess of about 500° F. with X-rays, such as X-rays obtainable by bombarding a brass or molybdenum target with a 20 microampere beam of 50 kilovolt electrons.

What is claimed is:

1. A method for preparing a violet titanium subchloride which comprises irradiating essentially a non-polar organic solvent solution of titanium tetrachloride in liquid phase with high energy ionizing radiation at a temperature of 520° to 600° F.

2. A method for preparing a violet titanium subchloride which comprises irradiating essentially a normal paraffinic solution of titanium tetrachloride with high energy ionizing radiation in liquid phase in the absence of compounds having substantial polarity at a temperature of 520° to 600° F.

3. A method as in claim 2 wherein the solvent is cetane.

4. A method for preparing a violet titanium subchloride which comprises irradiating essentially a non-polar saturated hydrocarbon solvent solution of titanium tetrachloride in liquid phase with high energy ionizing radiation at a temperature of 520° to 600° F., said irradiation having an intensity sufficient to provide an energy input of about 0.5 to about 5000 watthours of radiation per kilogram of solution.

5. A method as in claim 4 wherein the solvent is cetane, wherein the solution is irradiated in the absence of compounds having substantial polarity.

6. A method for preparing a violet titanium subchloride which comprises irradiating essentially a solution of titanium tetrachloride in a non-polar hydrocarbon solvent with high energy ionizing radiation having an intensity sufficient to provide an energy input of from about 5 to 500 watthours of radiation per kilogram of solution in liquid phase at a temperature within the range of 520° to 600° F. for a period of time sufficient to reduce said titanium tetrachloride to a solvent insoluble subchloride whereby a suspension of finely divided subchloride in said solvent is provided, and thereafter recovering said subchloride from said suspension.

7. A method for reducing titanium tetrachloride by about 1 superficial valence state in order to provide a violet titanium subchloride which comprises the steps of irradiating essentially a solution of said titanium tetrachloride in a non-polar hydrocarbon solvent at a temperature within the range of 520° to 600° F. with ionizing radiation having an intensity sufficient to provide an energy input of from about 0.5 to about 5000 watthours of radiation per kilogram of solution for a period of time within the range of about 0.1 to about 10 hours sufficient to provide an energy input within the range of about 5 to 500 watthours of radiation per kilogram of solution, whereby a suspension of said violet subchloride in finely divided form in said solvent is formed and thereafter recovering said subchloride from said suspension.

8. A method as in claim 7 wherein the said solution is a solution of about 0.1 to 20 volume percent of titanium tetrachloride in cetane.

References Cited in the file of this patent

UNITED STATES PATENTS

| | | |
|---|---|---|
| 2,830,888 | Wade | Apr. 15, 1958 |
| 2,833,641 | Wainer | May 6, 1958 |
| 2,845,414 | Schutze | July 29, 1958 |
| 2,859,162 | Bown et al. | Nov. 4, 1958 |
| 2,903,404 | Oita et al. | Sept. 8, 1959 |

OTHER REFERENCES

Bock et al.: "Chem. Abs.," vol. 7, page 1333 (1913).

Spicer: "Trans. Far. Soc.," vol. 31, pages 1706–1710 (1935).